Patented Aug. 13, 1929.

1,724,663

UNITED STATES PATENT OFFICE.

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE.

NEW DIAZO DYES.

No Drawing.   Application filed August 25, 1927.   Serial No. 215,515.

This invention relates to new disazo dyes for cotton, wool, silk, rayon, viscose, etc., and the processes for making same, said dyes having the following general formula:

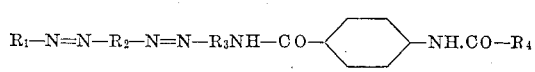

$R_1$, $R_2$, and $R_3$ meaning aromatic radicals of the benzene or naphthalene series not containing a free hydroxyl or amino group, the whole complex containing at least two acid groups adapted to form a salt, and $R_4$ meaning an aliphatic radical or aromatic radical of the benzene or naphthalene series not containing a free hydroxyl or amino group.

These dyes are obtained by coupling a diazo compound of the benzene or naphthalene series without a free hydroxyl or amino group to an amino compound of the benzene or naphthalene series containing only one free amino group and no hydroxyl group, and having a free para-position to the amino group, diazotizing the aminoazo-compound and coupling it again to an amino compound of the benzene or naphthalene series containing only one free amino group and no hydroxyl group, and having a free para-position to the amino group, then condensing the amino-disazo compound with nitro-benzoyl chloride, reducing the nitro-benzoyl compound, and finally condensing the resulting amino-benzoyl compound with an aliphatic or aromatic acid chloride or anhydride not containing a free hydroxyl or amino group.

By way of example, but not in limitation, the following illustrate specifically my new dyes and the process for obtaining same.

Example I.

303 parts of 2-naphthylamine-6:8-disulphonic acid are diazotized in the usual way. To the diazo compound there is added a solution of 107 parts m-toluidine in 2000 parts of water and 120 parts of a 31% hydrochloric acid solution. The mineral acid reaction of the coupling is neutralized with sodium acetate. The coupling is allowed to stir at 20-25° C. for about four to five hours when it will be found to be complete. After acidifying with hydrochloric acid the amino-azo compound is salted out and filtered. The paste is stirred up with 4,000 parts of water, dissolved with 50 parts of sodium hydroxide, then acidified with 350 parts of hydrochloric acid, and diazotized with 69 parts of sodium nitrite at 15-20° C. After 40-50 minutes' agitation the diazo compound will be complete. Again there is added a solution of 107 parts m-toluidine to the diazo compound, the mineral acid reaction again being neutralized with sodium acetate. This coupling will be found to be complete after 1½ to 2 hours stirring at 20-25° C. The animo-disazo dye is salted out and filtered. The paste is dissolved with 5000 parts of water and 60 quarts of sodium carbonate. The solution is heated up to 80-85° C., 53 parts of sodium carbonate are added, and while rapidly stirring 186 parts of para-nitro-benzoyl chloride are slowly added to the solution. The nitro-benzoyl compound will partly precipitate, and is fully precipitated by the addition of salt. After filtering, the paste is stirred up again with 6000 parts of water, heated up to about 70° C., and is reduced by a solution containing 84 parts of sodium hydrosulphide (NaHS). The animo-benzoyl compound shows a better solubility than the nitro compound and will be almost completely in solution when the reduction is finished. It is easily distinguished from the nitro compound by its ability of forming a diazo compound. The animo-benzoyl compound is salted out and filtered. The paste is dissolved with 7000 parts of water at about 30° C., 150 parts of sodium acetate (crystalline) are added, and then, while rapidly stirring, 141 parts of benzoyl chloride are added. After about two hours agitation the benzoylation will be complete, testing completeness by disappearance of the ability of forming a diazo compound. The reaction mass is made alkaline with sodium carbonate and salted out. The new dye is in its dry ground form an orange powder, soluble in concentrated sulphuric acid with a bluish-violet coloration. It has a very high tinctorial power for cotton, wool, silk, and rayon, but leaves acetyl cellulose white. It dyes these fibers in bright yellow shades which are fast to washing, exceptionally fast to light, fast to acid and alkali, and discharge white with hydrosulphite.

The new dye has most probably the following formula:

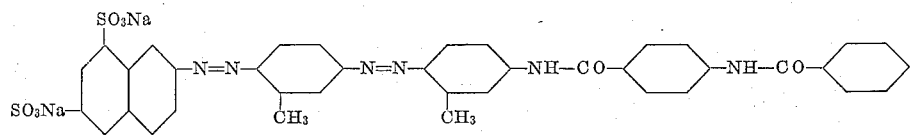

If 102 parts acetic anhydride are used instead of 141 parts of benzoyl chloride the corresponding acetyl derivative will be obtained, the shade and properties of which are similar to those of the benzoyl dye.

*Example II.*

If (in Example I) 303 parts of 2-naphthylamine-6:8-disulphonic acid are substituted by 303 parts of 2-naphthylamine-4:8-disulphonic acid, the first 107 parts of m-toluidine by 137 parts of cresidine the second 107 parts of m-toluidine by 123 parts of o-anisidine, leaving all the other conditions the same as in Example I, a dye will be obtained which in its dry, ground form is a reddish-brown powder, soluable in water with a bright orange coloration and in concentrated sulphuric acid with a bluish-gray coloration. It dyes the above mentioned fibers in bright orange shades of similar properties as the dye of Example I.

The new dye has most probably the following formula:

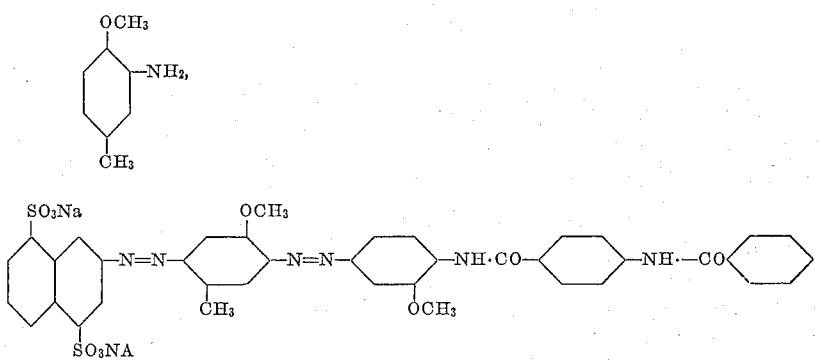

*Example III.*

173 parts of metanilic acid are diazotized in the usual way. The diazo compound is added to a solution of 223 parts of 1-naphthylamine-7-sulphonic acid in 2000 parts of water and 53 parts of sodium carbonate to which have been added, before the coupling 280 parts of sodium acetate. The temperature of the coupling should be 15–20° C. After one hour's stirring the coupling will be complete. It is made alkaline with sodium carbonate, salted out, and filtered. The paste is stirred up with 5000 parts of water, acidified with 320 parts of a 31% hydrochloric acid solution and diazotized at 15–20° C. with 69 parts of sodium nitrate. After one hour's stirring the diazo compound will be complete and there is then added to it a solution of 107 parts m-toluidine in 2000 parts of water and 120 parts of a 31% hydrochloric acid solution. The mineral acidity of the coupling is neutralized with sodium acetate. After two hour's stirring at 20–25° C. the coupling will be complete. The amino-disazo dye is salted out and filtered. The condensation with nitro-benzoylchloride, reduction, and benzoylation are carried out in the same way as in Example I. The new dye in its dry, ground form is a reddish-brown powder, soluble in water with an orange coloration; in concentrated sulphuric acid a green coloration. It dyes the different fibers in full yellowish-brown shades which have similar properties as the dye described in Example I.

The new dye has most probably the following formula:

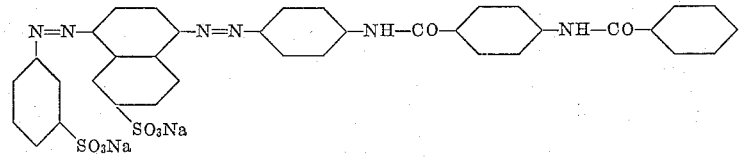

Example IV.

173 parts of para-sulphanilic acid are substituted for 173 parts of metanilic acid (in Example III), 223 parts of 1-naphthylamine-6-sulphonic acid for 223 parts of 1-naphthylamine-7-sulphonic acid, and 143 parts of alpha-naphthylamine for 107 parts of m-toluidine. All other conditions are left the same as in Example III. The new dye is in its dry, ground form a dark brown powder, soluble in water with a reddish-brown coloration and in concentrated sulphuric acid with an olive coloration. It dyes the different fibers in full reddish-brown shades of similar properties as the dye in Example I. The new dye has most probably the following formula:

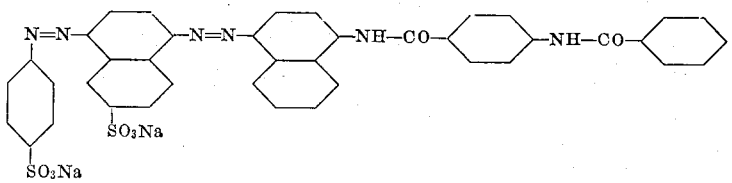

Instead of the first diazo compound already mentioned in the examples, there may be used other diazo compounds of the benzene or naphthalene series, which do not contain either a free amino nor a free hydroxy group, as aniline, toluidine, xylidine, anisidine, aniline-disulphonic acid, the various toluidine-, xylidine-, and anisidine-sulphonic acids, alpha- and beta- naphthylamine and their mono- or di-sulphonic acids, also amino-benzene or amino-naphthalene-carboxy acids, etc.

As first coupling components, there may be used, besides those already mentioned, o-anisidine, p-xylidine, aniline (coupled as omega methane sulphonic acid), alpha-naphthylamine, etc.

The compounds employed as first coupling components are also adapted to be employed as second coupling components.

The shades of the new dyes vary, according to the different components used, from yellow to orange to brown. The new dyes will dye wool, cotton, silk, rayon, and viscose equally well. The dyes show a very good fastness to washing and an excellent fastness to light. They are not sensitive to alkali and acid and discharge white with hydrosulphite.

As many apparently widely different embodiments of this invention may be made without departing from the spirit thereof, it is to be understood that I do not limit myself to the foregoing examples or description, except as indicated in the following claims.

I claim:

1. Disazo dyes having the following general formula:

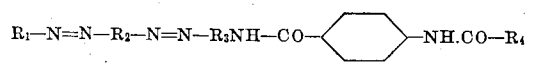

$R_1$, $R_2$, and $R_3$ meaning aromatic radicals of the benzene or napthalene series not containing a free hydroxyl or amino group, the whole complex containing at least two acid groups adapted to form a salt, and $R_4$ meaning an aliphatic radical or aromatic radical of the benzene or naphthalene series not containing a free hydroxyl or amino group.

2. The compound set forth in claim 1 in which $R_1$ represents an aromatic radical containing two acid groups.

3. The compound set forth in claim 1 in which $R_2$ contains a methyl group.

4. The compound set forth in claim 1 in which $R_2$ and $R_3$ each contain a methyl group.

5. A disazo dye having the following formula:

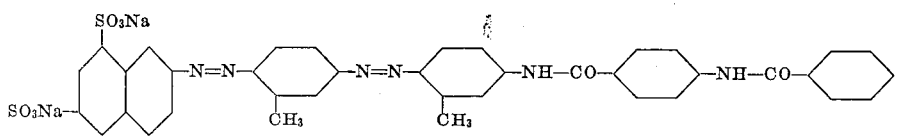

6. A process for making disazo dyes which comprises coupling a diazo compound of the benzene or naphthalene series without a free hydroxyl or amino group to an amino compound of the benzene or naphthalene series containing only one free amino group and no hydroxyl group, and having a free para-position to the amino group, diazotizing the aminoazo-compound and coupling it again to an amino compound of the benzene or naphthalene series containing only one free amino group and no hydroxyl group, and having a free para-position to the amino group, then condensing the aminodisazo compound with nitrobenzoyl chloride, reducing the nitro-benzoyl compound, and finally condensing the resulting amino-benzoyl compound with an aliphatic or aromatic acid chloride or anhydride not containing a free hydroxyl or amino group.

7. A process for making a disazo dye which comprises diazotizing 2-naphthylamine-6:8-disulphonic acid and coupling meta toluidine to the diazo compound formed, diazotizing the product of the coupling, coupling the diazotized product to meta toluidine, treating the product of the last mentioned reaction with para-nitrobenzoyl chloride, reducing the nitro-benzoyl compound to form an amino-benzoyl compound and benzoylating said amino-benzoyl compound with benzoyl-chloride.

8. A process for makig a disazo dye which comprises diazotizing 2-naphthylamine-6:8-disulphonic acid and coupling the compound formed to an amino compound of the benzene or naphthalene series containing only one free amino group and no hydroxyl group, and having a free para-position to the amino group, diazotizing the aminoazo-compound and coupling it again to an amino compound of the benzene or naphthalene series containing only one free amino group and no hydroxyl group, and having a free para-position to the amino group, then condensing the amino-disazo compound with nitro-benzoyl chloride, reducing the nitro-benzoyl compound, and finally condensing the resulting amino-benzoyl compound with an aliphatic or aromatic acid chloride or anhydride not containing a free hydroxyl or amino group.

9. A process for making a disazo dye which comprises coupling a diazo compound of the benzene or naphthalene series without a free hydroxyl or amino group to meta toluidine, diazotizing the aminoazo-compound and coupling it again to an amino compound of the benzene or naphthalene series containing only one free amino group and no hydroxyl group, and having a free para-position to the amino group, then condensing the amino-disazo compound with nitro-benzoyl chloride, reducing the nitro-benzoyl compound, and finally condensing the resulting amino-benzoyl compound with an aliphatic or aromatic acid chloride or anhydride not containing a free hydroxyl or amino group.

10. A process for making a disazo which comprises coupling a diazo compound of the benzene or naphthalene series without a free hydroxyl or amino group to meta toluidine, diazotizing the aminoazo-compound and coupling it again to meta toluidine, then condensing the amino-disazo compound with nitro-benzoyl chloride, reducing the nitro-benzoyl compound, and finally condensing the resulting amino-benzoyl compound with an aliphatic or aromatic acid chloride or anhydride not containing a free hydroxyl or amino group.

In testimony whereof I affix my signature.

HENRY JORDAN.

Certificate of Correction.

Patent No. 1,724,663.           Granted August 13, 1929, to

HENRY JORDAN

It is hereby certified that error appears in the printed specification of the above numbered patent requiring correction as follows: In the title for the word "Diazo" read *Disazo;* page 1, line 68, for the word "quarts" read *parts;* page 2, Example 11, the end of the long formula across the page should read same page, strike out the formula at the bottom of the page and insert instead

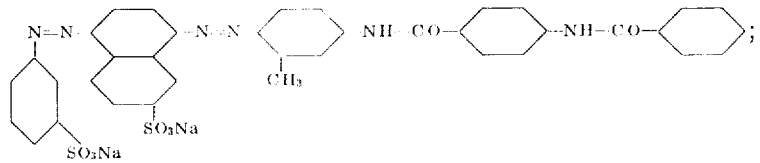

page 4, line 44, claim 10, after the word "disazo" insert the word *dye;* and that the said Letters Patent should be read with these corrections therein that the same may conform to the record of the case in the Patent Office.

Signed and sealed this 17th day of September, A. D. 1929.

[SEAL.]

M. J. MOORE,
*Acting Commissioner of Patents.*